(12) United States Patent
Schmidt et al.

(10) Patent No.: US 12,428,506 B2
(45) Date of Patent: Sep. 30, 2025

(54) METHOD FOR PREPARING SULFUR-POLYACRYLONITRILE (SPAN)

(71) Applicant: GM GLOBAL TECHNOLOGY OPERATIONS LLC, Detroit, MI (US)

(72) Inventors: Robert D. Schmidt, Howell, MI (US); Shuru Chen, Troy, MI (US); Fang Dai, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 876 days.

(21) Appl. No.: 17/690,831

(22) Filed: Mar. 9, 2022

(65) Prior Publication Data

US 2023/0287153 A1 Sep. 14, 2023

(51) Int. Cl.
*C08F 8/36* (2006.01)
*C08F 120/44* (2006.01)
*H01M 10/0525* (2010.01)
*H01M 10/0565* (2010.01)

(52) U.S. Cl.
CPC .............. *C08F 8/36* (2013.01); *C08F 120/44* (2013.01); *H01M 10/0525* (2013.01); *H01M 10/0565* (2013.01); *H01M 2300/0082* (2013.01)

(58) Field of Classification Search
CPC .............. C08F 8/34; C08F 8/36; C08F 120/44
See application file for complete search history.

(56) References Cited

U.S. PATENT DOCUMENTS

| 10,147,937 B2 | 12/2018 | Nogami et al. | |
| 2011/0200875 A1 * | 8/2011 | Miyuki | C08F 8/34 |
| | | | 429/213 |
| 2016/0204466 A1 * | 7/2016 | Nogami | H01M 4/62 |
| | | | 429/223 |
| 2017/0214040 A1 * | 7/2017 | Wang | H01M 4/58 |
| 2021/0194005 A1 * | 6/2021 | Kakiage | H01M 4/0404 |

FOREIGN PATENT DOCUMENTS

| CN | 110364720 A | * 10/2019 | .............. H01M 4/13 |
| CN | 115304798 A | 8/2022 | |
| CN | 116769074 A | 9/2023 | |
| DE | 102022126495 A1 | 9/2023 | |
| WO | WO-2013182353 A1 | * 12/2013 | ............ C08F 120/44 |

OTHER PUBLICATIONS

Pan et al Int J Electrochem 1-15 (Year: 2022).*

* cited by examiner

*Primary Examiner* — Mark S Kaucher

(74) *Attorney, Agent, or Firm* — Harness, Dickey & Pierce, P.L.C.

(57) ABSTRACT

Methods for forming sulfur polyacrylonitrile are provide. In certain variations, the method includes contacting sulfur and polyacrylonitrile to form an admixture, sealing a container holding the admixture, heating the admixture to a first temperature venting the container holding the admixture to release gases generated during the heating of the admixture to the first temperature, re-sealing the container holding the admixture, and heating the admixture to a second temperature. In other variations, the method includes contacting sulfur and polyacrylonitrile to form an admixture, heating the admixture to a first temperature, sealing a container holding the admixture, and heating the admixture to a second temperature. The second temperature is greater than the first temperature.

14 Claims, 3 Drawing Sheets

METHOD FOR PREPARING SULFUR-POLYACRYLONITRILE (SPAN)

GOVERNMENT FUNDING

This invention was made with government support under Agreement No. DE-EE0008230 awarded by the Department of Energy. The Government may have certain rights in the invention.

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Lithium-sulfur batteries can deliver high energy densities (e.g., up to about 2500 Wh/kg) and are generally available at lower costs (as compared to lithium-ion batteries), and are also, environmentally friendly.

Typical lithium-sulfur batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Many different materials may be used to create components for a lithium-sulfur battery. For example, in various aspects, a sulfur-based cathode material is often enabled by chemically bonding one or more ends of a sulfide, or polysulfide chain, to a polymeric backbone (such as, polyacrylonitrile (PAN)), such a configuration can reduce or inhibit the undesirable formation of polysulfides (that is, where active sulfur dissolves in the electrolyte and undesirably react with the negative electrode) during battery operation. The polysulfide shuttle often results in capacity fade, limiting the cycle life of a lithium-sulfur battery.

Methods for producing sulfur polyacrylonitrile (SPAN) often include cyclizing and partially dehydrogenating polyacrylonitrile and replacing one or more of the hydrogens with a short sulfur chain by raising the temperature of the sulfur and polyacrylonitrile in an open vent system under the protection of an inert gas flow. Such processes commonly include excess amounts of sulfur to compensate for the loss of vaporized sulfur at the elevated temperatures. The excess sulfur is lost (with $H_2S$ gases and sulfur) as exhaust vapor. It would be desirable to develop materials and systems for preparing sulfur polyacrylonitrile (SPAN) that reduces or limits sulfur loss.

SUMMARY

This section provides a general summary of the disclosure, and is not a comprehensive disclosure of its full scope or all of its features.

The present disclosure relates to processes for preparing sulfur polyacrylonitrile (SPAN), for example, for use within the lithium-sulfur batteries.

In various aspects, the present disclosure provides a method for forming sulfur polyacrylonitrile (SPAN). The method may include contacting sulfur (S) and polyacrylonitrile (PAN) to form an admixture having a mass ratio of sulfur:polyacrylonitrile of greater than or equal to about 1.2:1 to less than or equal to about 2:1 and heating the admixture.

In one aspect, the heating of the admixture may include heating the admixture to a first temperature and holding the first temperature for a first duration. The first temperature may be greater than or equal to about 300° C. to less than or equal to about 350° C. The first duration may be greater than 0 minutes to less than or equal to about 1,440 minutes.

In one aspect, the first duration may be greater than or equal to about 15 minutes to less than or equal to about 480 minutes.

In one aspect, the heating of the admixture to the first temperature may occur in a closed system, and the method may further include opening the closed system after the first duration to form a vented system that releases hydrogen sulfide gases.

In one aspect, the method may further include prior to the opening of the closed system, cooling the admixture to a second temperature that is less than the first temperature. For example, the second temperature may be greater than or equal to about 21° C. to less than about 300° C.

In one aspect, the method may further include sealing the vented system to form a sealed system, and the heating of the admixture may further include, in the sealed system, heating the admixture to a second temperature and holding the second temperature for a second duration. The second temperature may be greater than the first temperature. For example, the second temperature may be greater than or equal to about 400° C. to less than or equal to about 600° C. The second duration may be greater than 0 minutes to less than or equal to about 1,440 minutes.

In one aspect, the second duration may be greater than or equal to about 15 minutes to less than or equal to about 480 minutes.

In one aspect, the heating of the admixture to the first temperature may occur in an open system, and the method may further include sealing the open system to form a sealed system, and the heating of the admixture may further include, in the sealed system, heating the admixture to a second temperature and holding the second temperature for a second duration. The second temperature may be greater than the first temperature. For example, the second temperature may be greater than or equal to about 400° C. to less than or equal to about 600° C. The second duration may be greater than 0 minutes to less than or equal to about 1,440 minutes.

In one aspect, the method may further include, prior to the heating of the admixture to the second temperature, cooling the admixture to a third temperature. The third temperature may be less than the second temperature. For example, the second temperature may be greater than or equal to about 21° C. to less than about 300° C.

In one aspect, the method may further include, after the heating of the admixture to the second temperature, cooling the admixture to a third temperature. The third temperature may be less than the second temperature. For example, the third temperature may be greater than or equal to about 21° C. to less than about 300° C.

In various aspects, the present disclosure provides a method for forming sulfur polyacrylonitrile (SPAN). The method may include contacting sulfur (S) and polyacrylonitrile (PAN) to form an admixture, sealing a container holding the admixture, heating the admixture to a first temperature venting the container holding the admixture to release gases generated during the heating of the admixture to the first temperature, re-sealing the container holding the admixture, and heating the admixture to a second temperature.

In one aspect, the admixture may have a mass ratio of sulfur:polyacrylonitrile of greater than or equal to about 1.8:1 to less than or equal to about 2:1.

In one aspect, the first temperature may be greater than or equal to about 300° C. to less than or equal to about 350° C.

In one aspect, the second temperature may be greater than or equal to about 400° C. to less than or equal to about 600° C.

In one aspect, the method may further include, prior to the venting of the container holding the admixture, holding the first temperature for a first duration. The first duration may be greater than 0 minutes to less than or equal to about 1,440 minutes.

In one aspect, the method may further include, prior the venting of the container holding the admixture, cooling the admixture to a third temperature. The third temperature may be less than the first temperature. For example, the third temperature may be greater than or equal to about 21° C. to less than about 300° C.

In one aspect, the method may further include holding the second temperature for a second duration. The second duration may be greater than 0 minutes to less than or equal to about 1,440 minutes.

In various aspects, the present disclosure provides a method for forming sulfur polyacrylonitrile (SPAN). The method may include contacting sulfur (S) and polyacrylonitrile (PAN) to form an admixture, heating the admixture to a first temperature, sealing a container holding the admixture, and heating the admixture to a second temperature.

In one aspect, the admixture may have a mass ratio of sulfur:polyacrylonitrile of greater than or equal to about 1.8:1 to less than or equal to about 2:1.

In one aspect, the first temperature may be greater than or equal to about 300° C. to less than or equal to about 350° C.

In one aspect, the second temperature may be greater than or equal to about 400° C. to less than or equal to about 600° C.

In one aspect, the method may further include, prior to the sealing of the container, holding the admixture at the first temperature for a first duration. The first duration may be greater than 0 minutes to less than or equal to about 1,440 minutes.

In one aspect, the method may further include, prior to the sealing of the container holding the admixture, cooling the admixture to a third temperature. The third temperature may be less than the first temperature. For example, the third temperature may be greater than or equal to about 21° C. to less than about 300° C.

In one aspect, the method may further include holding the second temperature for a second duration. The second duration may be greater than 0 minutes to less than or equal to about 1,440 minutes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
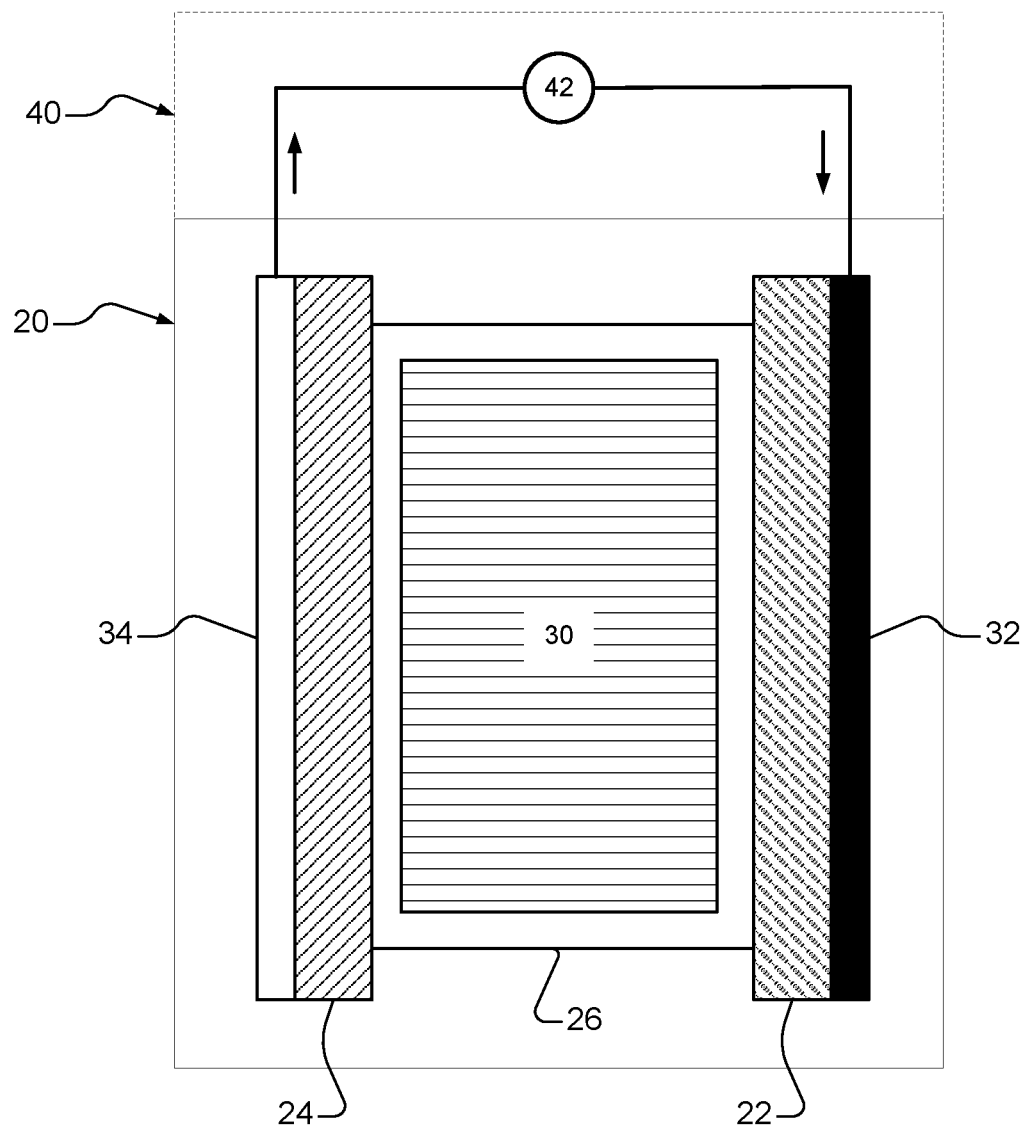
FIG. 1 is a schematic illustration of an example electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-sulfur battery includes a first electrode (such as a positive electrode or cathode) opposing a second electrode (such as a negative electrode or anode) and a separator and/or electrolyte disposed therebetween. Often, in a lithium-sulfur battery pack, batteries or cells may be electrically connected in a stack or winding configuration to increase overall output. Lithium-sulfur batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles (not shown). In the instance of solid-state batteries and/or semi-solid-state batteries, the positive electrode 24 and/or the negative electrode 22 may include a plurality of solid-state electrolyte particles (not shown). The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 may be a metal foil, metal grid or screen, or expanded metal comprising copper or any other appropriate electronically conductive material known to those of skill in the art. A second current collector 34 (e.g., a positive current collector) may be positioned at or near the positive electrode 24. The second electrode current collector 34 may be a metal foil, metal grid or screen, or expanded metal comprising aluminum or any other appropriate electronically conductive material known to those of skill in the art. The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the capacity of the battery 20 is diminished.

The battery 20 can be charged or re-energized at any time by connecting an external power source to the battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., lithium metal deposit or intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide (LiN($FSO_2$)$_2$) (LiFSI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

In various aspects, the separator 26 may be a microporous polymeric separator. The microporous polymeric separator may include, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of polyethylene (PE) and/or polypropylene (PP). Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 μm to less than or equal to about 50 μm, and in certain instances, optionally greater than or equal to about 1 μm to less than or equal to about 20 μm. The separator 26 may have an average thickness greater than or equal to 1 μm to less than or equal to 50 μm, and in certain instances, optionally greater than or equal to 1 μm to less than or equal to 20 μm.

In each variation, the separator 26 may further include one or more ceramic materials and/or one or more heat-resistant materials. For example, the separator 26 may also be admixed with the one or more ceramic materials and/or the one or more heat-resistant materials, or one or more surfaces of the separator 26 may be coated with the one or more ceramic materials and/or the one or more heat-resistant materials. The one or more ceramic materials may include, for example, alumina ($Al_2O_3$), silica ($SiO_2$), and the like. The heat-resistant material may include, for example, Nomex, Aramid, and the like.

In various aspects, the porous separator 26 and/or the electrolyte 30 disposed in the porous separator 26 as illustrated in FIG. 1 may be replaced with a solid-state electrolyte ("SSE") layer (not shown) and/or semi-solid-state electrolyte (e.g., gel) layer that functions as both an electrolyte and a separator. The solid-state electrolyte layer and/or semi-solid-state electrolyte layer may be disposed between the positive electrode 24 and negative electrode 22. The solid-state electrolyte layer and/or semi-solid-state electrolyte layer facilitates transfer of lithium ions, while mechanically separating and providing electrical insulation between the negative and positive electrodes 22, 24. By way of non-limiting example, the solid-state electrolyte layer and/or semi-solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S-P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The negative electrode 22 may be formed from a lithium host material that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. In certain variations, the negative electrode 22 may include a plurality of solid-state electrolyte particles (not shown). The negative electrode 22 may have an average thickness greater than or equal to about 1 μm to less than or equal to about 500 μm, and in certain aspects, optionally greater than or equal to about 10 μm to less than or equal to about 200 μm. The negative electrode 22 may have an average thickness greater than or equal to 1 μm to less than or equal to 500 μm, and in certain aspects, optionally greater than or equal to 10 μm to less than or equal to 200 μm.

In various aspects, the negative electroactive material may include lithium, for example, a lithium alloy (e.g., lithium-silicon, lithium-tin, and the like) and/or a lithium metal. For example, in certain variations, the negative electrode 22 may be defined by a lithium metal foil. The lithium metal foil may have an average thickness greater than or equal to about 0 nm to less than or equal to about 500 μm, and in certain aspects, optionally greater than or equal to about 50 nm to less than or equal to about 50 μm.

In other variations, the negative electroactive material may include, for example only, carbonaceous materials (such as, graphite, hard carbon, soft carbon, and the like) and metallic active materials (such as tin, aluminum, magnesium, germanium, and alloys thereof, and the like). In still other variations, the negative electroactive material may be a silicon-based electroactive material, and in further variations, the negative electroactive material may include a combination of the silicon-based electroactive material (i.e., first negative electroactive material) and one or more other negative electroactive materials. The one or more other negative electroactive materials include, for example only, carbonaceous materials (such as, graphite, hard carbon, soft carbon, and the like) and metallic active materials (such as tin, aluminum, magnesium, germanium, and alloys thereof, and the like). For example, in certain variations, the negative electroactive material may include a carbonaceous-silicon based composite including, for example, about 10 wt. % of a silicon-based electroactive material and about 90 wt. % graphite. The negative electroactive material may include a carbonaceous-silicon based composite including, for example, 10 wt. % of a silicon-based electroactive material and 90 wt. % graphite.

In certain variations, for example, when the negative electrode includes carbonaceous and/or silicon-based electroactive materials, the negative electroactive material(s) in the negative electrode 22 may be optionally intermingled with one or more electrically conductive materials that provide an electron conductive path and/or at least one polymeric binder material that improves the structural integrity of the negative electrode 22.

For example, the negative electroactive material(s) in the negative electrode 22 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate.

Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the negative electrode 22 may include greater than or equal to about 10 wt. % to less than or equal to about 99 wt. %, and in certain aspects, optionally greater than or equal to about 60 wt. % to less than or equal to about 99 wt. %, of the negative electroactive material; greater than or equal to 0 wt. % to less than or equal to about 40 wt. %, and in certain aspects, optionally greater than or equal to about 0.5 wt. % to less than or equal to about 20 wt. %, of the electronically conducting material; and greater than or equal to 0 wt. % to less than or equal to about 40 wt. %, and in certain aspects, optionally greater than or equal to about 0.5 wt. % to less than or equal to about 20 wt. %, of the at least one polymeric binder.

In certain variations, the negative electrode 22 may include greater than or equal to 10 wt. % to less than or equal to 99 wt. %, and in certain aspects, optionally greater than or equal to 60 wt. % to less than or equal to 99 wt. %, of the negative electroactive material; greater than or equal to 0 wt. % to less than or equal to 40 wt. %, and in certain aspects, optionally greater than or equal to 0.5 wt. % to less than or equal to 20 wt. %, of the electronically conducting material; and greater than or equal to 0 wt. % to less than or equal to 40 wt. %, and in certain aspects, optionally greater than or equal to 0.5 wt. % to less than or equal to 20 wt. %, of the at least one polymeric binder.

The positive electrode 24 may be formed from a sulfur-based active material that is capable of undergoing lithium intercalation and deintercalation, alloying and dealloying, reversible phase conversion reaction, or plating and stripping, while functioning as the positive terminal of the battery 20. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. For example, in certain variations, the positive electrode 24 may include a plurality of solid-state electrolyte particles (not shown). In each instance, the positive electrode 24 may have a thickness greater than or equal to about 1 μm to less than or equal to about 500 μm, and in certain aspects, optionally greater than or equal to about 10 μm to less than or equal to about 200 μm. The positive electrode 24 may have a thickness greater than or equal to 1 μm to less than or equal to 500 μm, and in certain aspects, optionally greater than or equal to 10 μm to less than or equal to 200 μm.

In various aspects, the positive electrode 24 includes a sulfur-containing electroactive material and a sulfur host material. In other words, the positive electrode 24 may include s polymer (i.e., sulfur host material) having a sulfur chain (i.e., sulfur-containing electroactive material) bonded thereto. The sulfur host material may be a conducting polymer-based host, including, for example only, polyacrylonitrile (PAN), polyaniline (PANI), polypyrrole (PPy), polythiophene (Pt), polyaniline (PAni), poly(3,4-ethylenedioxythiophene:poly(styrenesulfonate) (PEDOT:PSS), and the like.

In certain variations, the positive electrode 24 may include greater than or equal to about 20 wt. % to less than or equal to about 98 wt. %, and in certain aspects, optionally greater than or equal to about 60 wt. % to less than or equal to about 90 wt. %, of the sulfur-containing electroactive material, and greater than or equal to about 2 wt. % to less than or equal to about 60 wt. %, and in certain aspects, optionally greater than or equal to about 10 wt. % to less than or equal to about 30 wt. %, of the sulfur host material. In other variations, the positive electrode 24 may include greater than or equal to 20 wt. % to less than or equal to 98 wt. %, and in certain aspects, optionally greater than or equal to 60 wt. % to less than or equal to 90 wt. %, of the sulfur-containing electroactive material, and greater than or equal to 2 wt. % to less than or equal to 60 wt. %, and in certain aspects, optionally greater than or equal to 10 wt. % to less than or equal to 30 wt. %, of the sulfur host material.

In various aspects, the sulfur-containing electroactive material and the sulfur host material in the positive electrode 24 may be optionally intermingled with one or more electronically conductive materials that provide an electron conductive path and/or at least one polymeric binder material that improves the structural integrity of the positive electrode 24. For example, the positive electroactive material in the positive electrode 24 may be optionally intermingled (e.g., slurry cast) with binders like polyimide, polyamic acid, polyamide, polysulfone, polyvinylidene difluoride (PVdF), polyvinylidene difluoride (PVdF) copolymers, polytetrafluoroethylene (PTFE), polytetrafluoroethylene (PTFE) copolymers, polyacrylic acid, blends of polyvinylidene fluoride and polyhexafluoropropene, polychlorotrifluoroethylene, ethylene propylene diene monomer (EPDM) rubber, carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate.

Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like. In certain aspects, mixtures of the conductive materials may be used.

In various aspects, the positive electrode 24 may include greater than or equal to 0 wt. % to less than or equal to about 40 wt. %, optionally greater than or equal to about 0.5 wt. % to less than or equal to about 20 wt. %, and in certain aspects, optionally greater than or equal to about 0.5 wt. % to less than or equal to about 5 wt. %, of the electronically conducting material; and greater than or equal to 0 wt. % to less than or equal to about 40 wt. %, optionally greater than or equal to about 0.5 wt. % to less than or equal to about 20 wt. %, and in certain aspects, optionally greater than or equal to about 0.5 wt. % to less than or equal to about 9 wt. %, of the at least one polymeric binder.

In certain variations, the positive electrode 24 may include greater than or equal to 0 wt. % to less than or equal to 40 wt. %, optionally greater than or equal to 0.5 wt. % to less than or equal to 20 wt. %, and in certain aspects, optionally greater than or equal to 0.5 wt. % to less than or equal to 5 wt. %, of the electronically conducting material; and greater than or equal to 0 wt. % to less than or equal to 40 wt. %, optionally greater than or equal to 0.5 wt. % to less than or equal to 20 wt. %, and in certain aspects, optionally greater than or equal to 0.5 wt. % to less than or equal to 9 wt. %, of the at least one polymeric binder.

In various aspects, the present disclosure provides methods for preparing a sulfur-based positive electroactive material including, for example, sulfur and a conducting polymer-based host (such as polyacrylonitrile (PAN), polyaniline (PANI), polypyrrole (PPy), polythiophene (Pt), polyaniline (PAni), poly(3,4-ethylenedioxythiophene:poly(styrenesulfonate) (PEDOT:PSS), and the like), such can be used in the positive electrode 24 as illustrated in FIG. 1. Methods for preparing sulfur-based positive electroactive materials (like sulfur polyacrylonitrile (SPAN)) often include cyclizing and partially dehydrogenating the polymer-based host (e.g., polyacrylonitrile) and replacing one or more of the hydrogens with a short sulfur chain by raising the temperature of the sulfur and polyacrylonitrile in an open vent system under the protection of an inert gas flow (e.g., $N_2$, Ar, and the like) to temperatures ranging from about 250° C. to about 600° C., and preferably around about 450° C. Such processes often include excess amounts of sulfur to compensate for the loss of vaporized sulfur at the elevated temperatures. For example, methods for producing sulfur polyacrylonitrile (SPAN) often include using a mass ratio between about 3:1 and about 6:1 of sulfur:polyacrylonitrile, when the reaction only actually requires between about 1.2:1 and about 1.6:1 of sulfur:polyacrylonitrile. The excess sulfur is lost (with $H_2S$ gases and sulfur) as exhaust vapor.

Methods for preparing sulfur-based positive electroactive materials (like sulfur polyacrylonitrile (SPAN)) in accordance with various aspects of the present disclosure include two principal steps or parts—a open or vented process step and a closed or unvented process step. This two-step process permits hydrogen sulfide ($H_2S$) gases to be evacuated following the dehydrogenation of the polymer-based host (e.g., polyacrylonitrile (PAN)), and prior to the attachment of the short sulfur chains (e.g., having greater than or equal to 1 to less than or equal to 4 sulfur atoms) to the dehydrogenated polymer-based host, without carrying a significant sulfur vapor. Thus, the two-step process reduces the total amount of sulfur needed to complete the reaction, and as such, the associated costs and environmental impacts.

Figure 2:
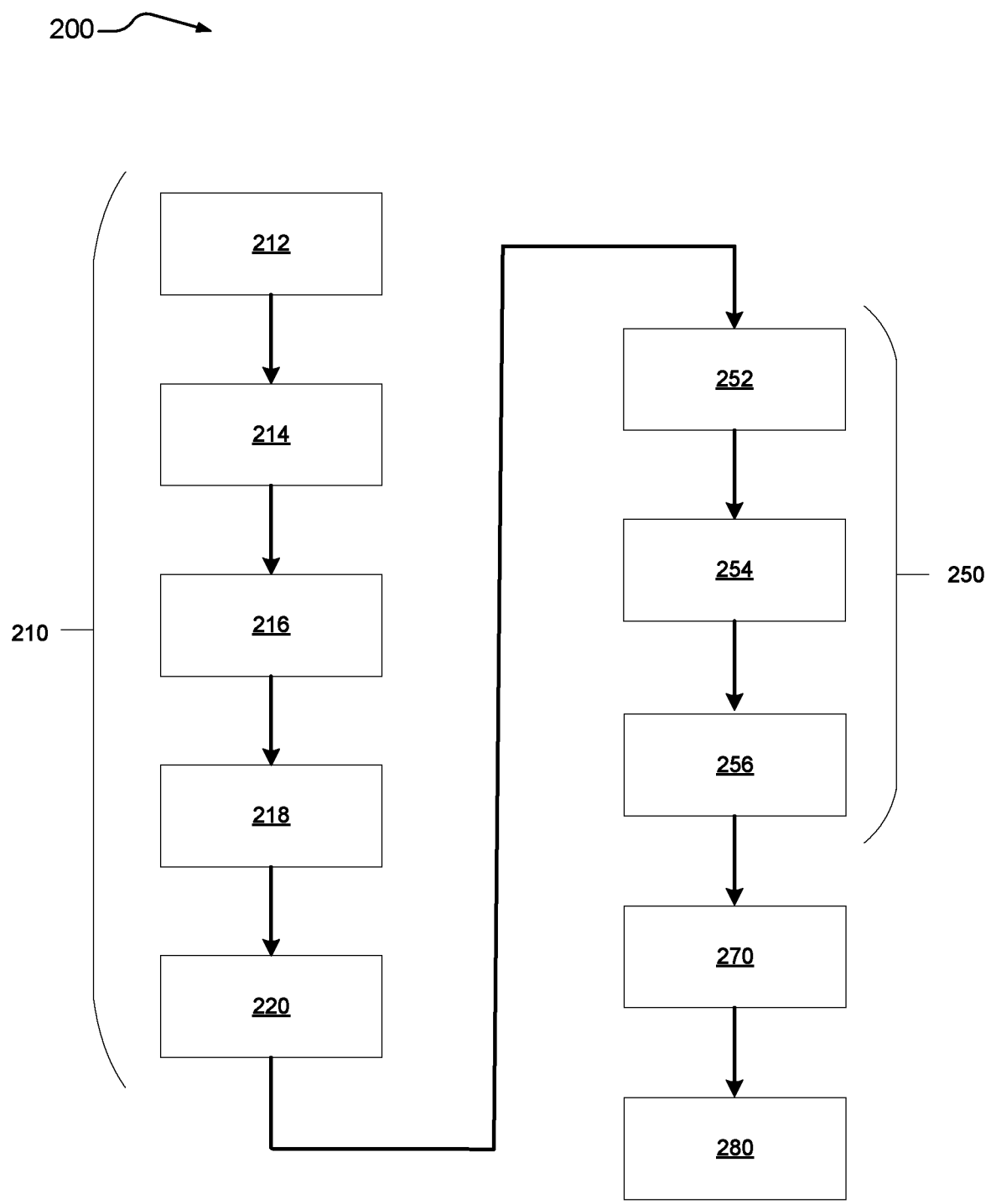
FIG. 2 is a flowchart illustrating an example method for preparing sulfur polyacrylonitrile (SPAN) (for example, for use in an electrochemical battery like that illustrated in FIG. 1) in accordance with various aspects of the present disclosure.

By way of example, FIG. 2 illustrates an example method 200 for preparing sulfur polyacrylonitrile. The method 200 includes contacting 212 sulfur and polyacrylonitrile to form an admixture. The admixture may have, for example, a mass ratio greater than or equal to about 1:1 to less than or equal to about 2:1, optionally greater than or equal to about 1.2:1 to less than or equal to about 2:1, optionally greater than or equal to about 1.8:1 to less than or equal to about 2:1, and in certain aspects, optionally greater than or equal to about 1.2:1 to less than or equal to about 1.6:1, of sulfur:polyacrylonitrile. In certain variations, the admixture may have a mass ratio greater than or equal to 1:1 to less than or equal to 2:1, optionally greater than or equal to 1.2:1 to less than or equal to 2:1, optionally greater than or equal to 1.8:1 to less than or equal to 2:1, and in certain aspects, optionally greater than or equal to 1.2:1 to less than or equal to 1.6:1, of sulfur:polyacrylonitrile. The contacting 212 may include mixing together the sulfur and the polyacrylonitrile (for example only, using zirconia balls on a tumbler).

The method 200 further includes heating 214 (for example, using a box furnace) the admixture to a first temperature. In certain variations, the method 200 may include optionally holding 216 the admixture at the first temperature for a first duration. The first duration may be greater than or equal to 0 minutes to less than or equal to about 1,440 minutes, and in certain aspects, optionally greater than or equal to about 15 minutes to less than or equal to about 480 minutes. The first duration may be greater than or equal to 0 minutes to less than or equal to 1,440 minutes, and in certain aspects, optionally greater than or equal to 15 minutes to less than or equal to 480 minutes.

The heating 214 occurs in a closed system, and the method 200 further includes, as illustrated, venting 220 the system. In certain variations, the method 200 may further include cooling 218 the admixture to a second temperature prior to the venting 220. By way of non-limiting example, in certain instances, the closed system may be a fused quartz tube flame sealed on one end capped with a pressure relief valve on the other end, where the pressure relief valve remains at room temperature during the heating process. In such instances, the contacting 212 may include adding the admixture to the fused quartz tube, or adding the sulfur and polyacrylonitrile concurrently or consecutively to the fused quartz tube, and the venting 220 may include removing the pressure relief value from the other end of the fused quartz tube.

In each instance, the first temperature may be greater than or equal to about 300° C. to less than or equal to about 350° C., and in certain aspects, optionally greater than or equal to 300° C. to less than or equal to 350° C. The second temperature is lower than or equal to the first temperature. For example, the second temperature may be greater than or equal to about 21° C. to less than about 300° C., and in certain aspects, optionally greater than or equal to 21° C. to less than 300° C. During the first heating step 214 the polyacrylonitrile (PAN) is cyclized and partially dehydrogenated, resulting in the formation of hydrogen sulfide ($H_2S$) gas and sulfur gas and a high vapor pressure. During the cooling 218, the sulfur is condensed such that during subsequent venting 220 hydrogen sulfide gases can be vented without carrying a significant (e.g., <10% of gas volume) sulfur vapor, thereby reducing the vapor pressure. Such is possible because at about 350° C., the vapor pressure of sulfur is about 0.2 atm, while at about 300° C., the vapor pressure of sulfur is about 0.06 atm, and in contrast, hydrogen sulfide has a critical point of about 100° C. at about 90 atm. The contacting 212, heating 214, holding 216, cooling 218, and/or venting 220 define an open or vented process step 210.

After venting 218, the method 200 includes sealing 252 the admixture within a vessel (or container) and heating 254 the admixture to a third temperature such that short sulfur chains attach to the dehydrogenized polymer-based host to form the sulfur polyacrylonitrile. As would be recognized by the skilled artisan, in certain variations, the sealing 252 may include sealing, for example, the fused quartz tube. In other variations, the sealing 252 may include transferring the admixture to another container sealing that container. In each instance, the sealing 252 prevents sulfur vapor losses during the heating 254 step.

The third temperature is greater than the first temperature. For example, the third temperature may be greater than or equal to about 400° C. to less than or equal to about 600° C., and in certain aspects, optionally greater than or equal to about 400° C. to less than or equal to about 550° C. In certain variations, the third temperature may be greater than or equal to 400° C. to less than or equal to 600° C., and in certain aspects, optionally greater than or equal to 400° C. to less than or equal to 550° C. In certain variations, the method 200 may include optionally holding 256 the admixture at the third temperature for a second duration. The second duration may be greater than or equal to 0 minutes to less than or equal to about 1,440 minutes, and in certain aspects, optionally greater than or equal to about 15 minutes to less than or equal to about 480 minutes. In other instances, the second duration may be greater than or equal to 0 minutes to less than or equal to 1,440 minutes, and in certain aspects, optionally greater than or equal to 15 minutes to less than or equal to 480 minutes. The sealing 252, heating 254, and/or holding 256 define a closed or unvented process step 250.

In various aspects, the method 200 may further include cooling 270 the sulfur polyacrylonitrile (as formed) to room temperature (e.g., about 25° C.) after the first temperature. In certain variations, the method 200 may include various other processing steps, including but limited to, heating the sulfur polyacrylonitrile (as formed) from room temperature to an elevated temperature so as to remove excess sulfur. In each variation, the method 200 may further include incorporating 280 the sulfur polyacrylonitrile into an electrode.

Figure 3:
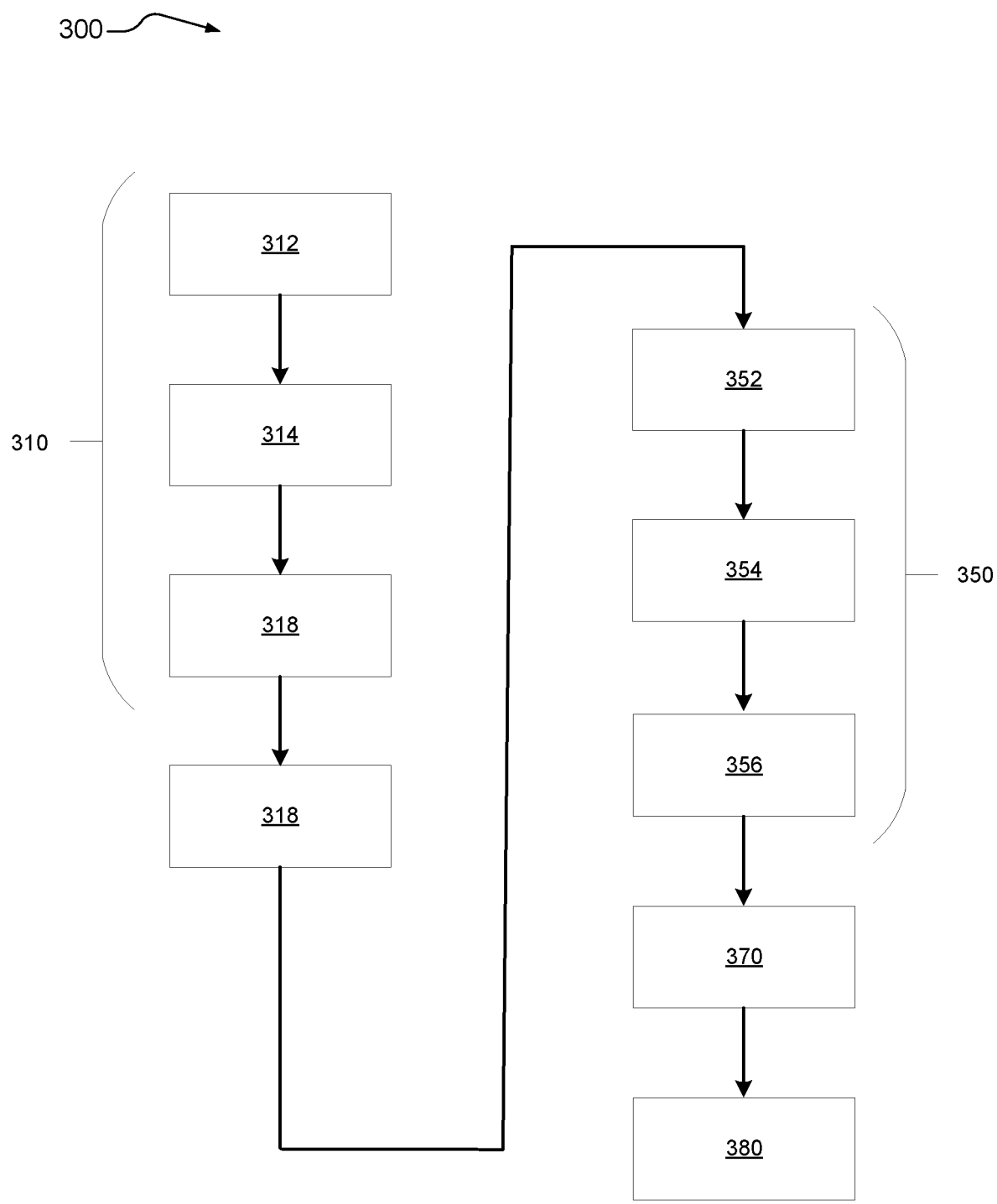
FIG. 3 is a flowchart illustrating another example method for preparing sulfur polyacrylonitrile (SPAN) (for example, for use in an electrochemical battery like that illustrated in FIG. 1) in accordance with various aspects of the present disclosure.

FIG. 3 illustrates another example method 300 for preparing sulfur polyacrylonitrile. Like the method 200, the method 300 includes contacting 312 sulfur and polyacrylonitrile to form an admixture. The admixture may have, for example, a mass ratio greater than or equal to about 1:1 to less than or equal to about 2:1, optionally greater than or equal to about 1.2:1 to less than or equal to about 2:1, optionally greater than or equal to about 1.8:1 to less than or equal to about 2:1, and in certain aspects, optionally greater than or equal to about 1.2:1 to less than or equal to about 1.6:1, of sulfur:polyacrylonitrile. In certain variations, the admixture may have a mass ratio greater than or equal to 1:1 to less than or equal to 2:1, optionally greater than or equal to 1.2:1 to less than or equal to 2:1, optionally greater than or equal to 1.8:1 to less than or equal to 2:1, and in certain aspects, optionally greater than or equal to 1.2:1 to less than or equal to 1.6:1, of sulfur:polyacrylonitrile. In certain variations, contacting 312 may include mixing together the sulfur and the polyacrylonitrile.

The method 300 further includes heating 314 the admixture to a first temperature. The first temperature may be greater than or equal to about 300° C. to less than or equal to about 350° C., and in certain aspects, optionally greater than or equal to 300° C. to less than or equal to 350° C. In certain variations, the method 300 may include optionally holding 316 the admixture at the first temperature for a first duration. The first duration may be greater than or equal to 0 minutes to less than or equal to about 1,440 minutes, and in certain aspects, optionally greater than or equal to about 15 minutes to less than or equal to about 480 minutes. In other instances, the first duration may be greater than or equal to 0 minutes to less than or equal to 1,440 minutes, and in certain aspects, optionally greater than or equal to 15 minutes to less than or equal to 480 minutes. Unlike the method 200, in this instance, the heating 314, and optional holding 316, occurs in an open or vented system such that hydrogen sulfide gases can evacuate throughout the heating 314 process. Thus, the contacting 312, heating 314, and/or holding 316 define an open or vented process step 210.

The method 300 further includes sealing 352 the admixture within a vessel (or container) and heating 354 the admixture to a third temperature such that short sulfur chains attach to the dehydrogenized polymer-based host to form the sulfur polyacrylonitrile. As would be recognized by the skilled artisan, in certain variations, the sealing 352 may include sealing the open or vented. In other variations, the sealing 252 may include transferring the admixture to another container sealing that container. In each instance, the sealing 252 prevents sulfur vapor losses during the heating 254 step. In certain variations, the method 300 may include cooling 318 the admixture to a second temperature prior to the sealing 352. The second temperature may be greater than or equal to about 21° C. to less than about 300° C., and in certain aspects, optionally greater than or equal to 21° C. to less than 300° C.

In each variation, the method 300 may include optionally holding 356 the admixture at the third temperature for a second duration. The second duration may be greater than or equal to 0 minutes to less than or equal to about 1,440 minutes, and in certain aspects, optionally greater than or equal to about 15 minutes to less than or equal to about 480 minutes. In other instances, the second duration may be greater than or equal to 0 minutes to less than or equal to 1,440 minutes, and in certain aspects, optionally greater than or equal to 15 minutes to less than or equal to 480 minutes. The third temperature is greater than the first temperature. For example, the third temperature may be greater than or equal to about 400° C. to less than or equal to about 600° C., and in certain aspects, optionally greater than or equal to about 400° C. to less than or equal to about 550° C. In certain variations, the third temperature may be greater than or equal to 400° C. to less than or equal to 600° C., and in certain aspects, optionally greater than or equal to 400° C. to less than or equal to 550° C. The sealing 352, heating 354, and/or holding 356 define a closed or unvented process step 350.

In various aspects, the method 300 may further include cooling 370 the sulfur polyacrylonitrile (as formed) to room temperature (e.g., about 25° C.). In certain variations, the method 300 may include various other processing steps, including but limited to, heating the sulfur polyacrylonitrile (as formed) from room temperature to an elevated temperature so as to remove excess sulfur. In each variation, the method 300 may further include incorporating 380 the sulfur polyacrylonitrile into an electrode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming sulfur polyacrylonitrile (SPAN), the method comprising:
    contacting sulfur(S) and polyacrylonitrile (PAN) to form an admixture having a mass ratio of sulfur:polyacrylonitrile of greater than or equal to about 1.2:1 to less than or equal to about 2:1;
    heating the admixture in an open system to a first temperature and holding the first temperature for a first duration, the first temperature being greater than or equal to about 300° C. to less than or equal to about 350° C., the first duration being greater than 0 minutes to less than or equal to about 1,440 minutes;
    sealing the open system to form a sealed system, and
    heating the admixture to a second temperature and holding the second temperature for a second duration, the second temperature being greater than or equal to about 400° C. to less than or equal to about 600° C., the second duration being greater than 0 minutes to less than or equal to about 1,440 minutes.

2. The method of claim 1, wherein the first duration is greater than or equal to about 15 minutes to less than or equal to about 480 minutes.

3. The method of claim 1, wherein the second duration is greater than or equal to about 15 minutes to less than or equal to about 480 minutes.

4. The method of claim 1, wherein the method further comprises, prior to the heating of the admixture to the second temperature, cooling the admixture to a third temperature greater than or equal to about 21° C. to less than about 300° C.

5. The method of claim 1, wherein the method further comprises, after the heating of the admixture to the second temperature, cooling the admixture to a third temperature greater than or equal to about 21° C. to less than about 300° C.

6. A method for forming sulfur polyacrylonitrile (SPAN), the method comprising:
    contacting sulfur(S) and polyacrylonitrile (PAN) to form an admixture;
    sealing a container holding the admixture;
    heating the admixture to a first temperature;
    venting the container holding the admixture to release gases generated during the heating of the admixture to the first temperature;
    re-sealing the container holding the admixture; and
    heating the admixture to a second temperature that is greater than the first temperature.

7. The method of claim 6, wherein the admixture has a mass ratio of sulfur:polyacrylonitrile of greater than or equal to about 1.8:1 to less than or equal to about 2:1,
    the first temperature is greater than or equal to about 300° C. to less than or equal to about 350° C., and
    the second temperature is greater than or equal to about 400° C. to less than or equal to about 600° C.

8. The method of claim 6, wherein the method further comprises:
    prior to the venting of the container holding the admixture, holding the first temperature for a first duration greater than 0 minutes to less than or equal to about 1,440 minutes.

9. The method of claim 6, wherein the method further comprises:
    prior the venting of the container holding the admixture, cooling the admixture to a third temperature that is less than the first temperature.

10. The method of claim 6, wherein the method further comprises:
    holding the second temperature for a second duration greater than 0 minutes to less than or equal to about 1,440 minutes.

11. A method for forming sulfur polyacrylonitrile (SPAN), the method comprising:
    contacting sulfur(S) and polyacrylonitrile (PAN) to form an admixture having a mass ratio of sulfur:polyacrylonitrile of greater than or equal to about 1.8:1 to less than or equal to about 2:1;
    heating the admixture to a first temperature greater than or equal to about 300° C. to less than or equal to about 350° C.;
    sealing a container holding the admixture; and
    heating the admixture to a second temperature that is greater than the first temperature, the second temperature being greater than or equal to about 400° C. to less than or equal to about 600° C.

12. The method of claim 11, wherein the method further comprises:
    prior to the sealing of the container holding the admixture at the first temperature for a first duration greater than 0 minutes to less than or equal to about 1,440 minutes.

13. The method of claim 11, wherein the method further comprises:
    prior to the sealing of the container holding the admixture, cooling the admixture to a third temperature greater that is less than the first temperature.

14. The method of claim 11, wherein the method further comprises:
    holding the second temperature for a second duration greater than 0 minutes to less than or equal to about 1,440 minutes.

* * * * *